(12) United States Patent
Bierwirth et al.

(10) Patent No.: US 7,137,339 B2
(45) Date of Patent: Nov. 21, 2006

(54) GAS GENERATOR

(75) Inventors: Sebastian Bierwirth, Rechtmehring (DE); Karsten Schwuchow, Wasserburg (DE); Rolf Ruckdeschel, Schwangau (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 0 days.

(21) Appl. No.: 10/650,237

(22) Filed: Aug. 28, 2003

(65) Prior Publication Data

US 2004/0068980 A1    Apr. 15, 2004

(30) Foreign Application Priority Data

Sep. 3, 2002    (DE) .................... 102 40 639

(51) Int. Cl.
 *F42C 19/02*    (2006.01)
(52) U.S. Cl. .............. 102/202; 102/202.14; 280/736; 280/741
(58) Field of Classification Search ............ 102/202, 102/202.9, 202.14, 202.12; 280/736, 741, 280/737, 740
See application file for complete search history.

(56) References Cited

U.S. PATENT DOCUMENTS

| | | | |
|---|---|---|---|
| 3,944,251 A | | 3/1976 | Lynch .................... 280/731 |
| 4,796,912 A * | | 1/1989 | Lauritzen et al. ........... 280/736 |
| 5,062,367 A * | | 11/1991 | Hayashi et al. ............. 102/530 |
| 5,160,163 A * | | 11/1992 | Castagner et al. .......... 280/740 |
| 5,772,243 A | | 6/1998 | Green et al. ................ 280/741 |
| 5,808,232 A * | | 9/1998 | Siddiqui ..................... 102/530 |
| 5,827,993 A * | | 10/1998 | Beau .......................... 102/202 |
| 5,934,705 A * | | 8/1999 | Siddiqui et al. ............. 280/736 |
| 6,095,556 A * | | 8/2000 | Bailey et al. ............... 280/737 |
| 6,131,948 A * | | 10/2000 | Cuevas ....................... 280/737 |
| 6,206,414 B1 * | | 3/2001 | Cook et al. ................. 280/734 |
| 6,554,315 B1 * | | 4/2003 | Freesmeier ............... 280/730.2 |
| 6,746,046 B1 * | | 6/2004 | Rink et al. .................. 280/737 |
| 6,851,705 B1 * | | 2/2005 | Young et al. ............... 280/729 |
| 2001/0020778 A1 | | 9/2001 | Unterforsthuber et al. ... 280/741 |
| 2002/0130502 A1 * | | 9/2002 | Jonsson et al. ............. 280/737 |
| 2003/0178827 A1 * | | 9/2003 | Dinsdale et al. ............ 280/736 |
| 2003/0178828 A1 * | | 9/2003 | Rink et al. .................. 280/741 |

FOREIGN PATENT DOCUMENTS

DE    4019877    1/1992

(Continued)

OTHER PUBLICATIONS

US 6,237,489, 05/2001, Winterhalder et al. (withdrawn)

*Primary Examiner*—Stephen M. Johnson
(74) *Attorney, Agent, or Firm*—Tarolli, Sundheim, Covell & Tummino LLP

(57) ABSTRACT

A gas generator comprises an elongated, preferably tubular outer housing (10), at least one combustion chamber (26, 28) provided therein and filled with a solid propellant (30; 30'), and at least one igniter unit (16, 18) generating ignition gas for igniting the solid propellant (30; 30'). The igniter unit (16, 18) is arranged laterally and externally on the outer housing (10) in such a way and, in relation to the outer housing (10), a preferably radial ignition transfer opening (50, 58) is provided in the outer housing so that ignition gas generated in the igniter unit (16, 18) flows into the interior of the outer housing (10) via the ignition transfer 1 openings (50, 58).

28 Claims, 2 Drawing Sheets

FOREIGN PATENT DOCUMENTS

| | | |
|---|---|---|
| DE | 19709597 | 9/1998 |
| DE | 19728438 | 1/1999 |
| EP | 0316119 | 5/1989 |
| EP | 0745518 | 12/1996 |
| EP | 1205363 | 5/2002 |
| JP | 4/87859 * | 7/1990 |
| WO | WO 01/56833 | 8/2001 |

* cited by examiner

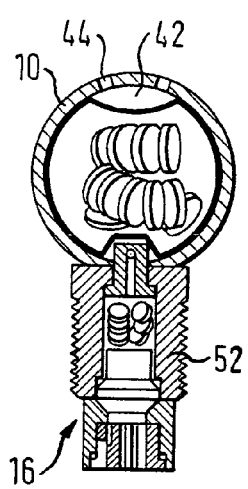
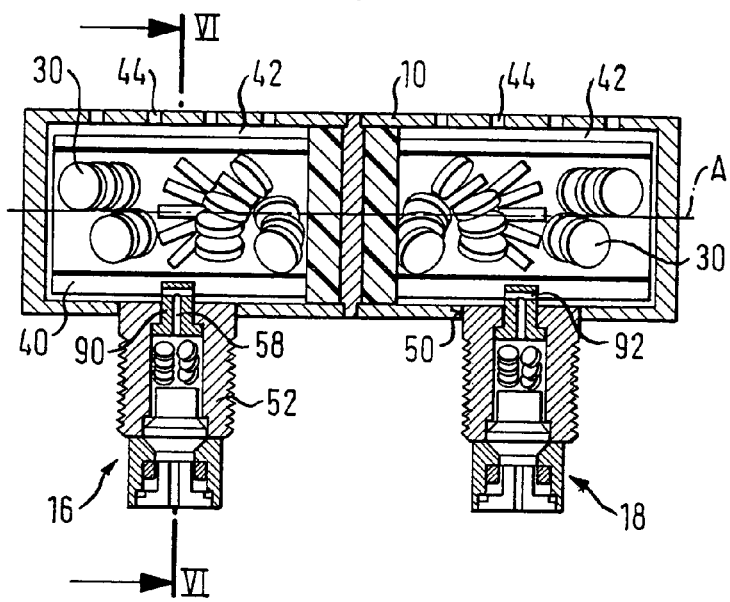
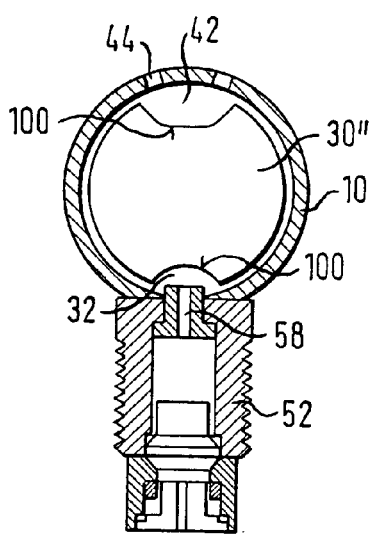

GAS GENERATOR

TECHNICAL FIELD

The invention relates to a gas generator with an elongated, preferably tubular outer housing, at least one combustion chamber provided therein and filled with a solid propellant, and at least one igniter unit generating ignition gas for igniting the solid propellant.

BACKGROUND OF THE INVENTION

Elongated gas generators, also known as tubular gas generators, usually have an axial length which distinctly exceeds the diameter of the outer housing. The length generally amounts to more than twice the diameter. The gas generators are to make possible a rapid ignition of the propellant across a large area. A possible problem in the through-flow of the solid propellant through already generated gas is the erosion on the surface of the propellant, which can lead to an output development which is more difficult to calculate. The aim is therefore to achieve a "gentle" ignition of the propellant and to avoid an intense erosion of the propellant, whereby high pressure peaks in the combustion chamber can be avoided and at the same time the minimum pressure in the combustion chamber, necessary for combustion, can be maintained at a certain level for the entire duration of combustion. Furthermore, it is to be achieved that the solid propellant can be filled into the combustion chamber without any problems.

BRIEF SUMMARY OF THE INVENTION

According to the invention, a gas generator comprises an elongated, preferably tubular outer housing, at least one combustion chamber provided therein and filled with a solid propellant, and at least one igniter unit for igniting the solid propellant. The igniter unit is arranged laterally and externally on the outer housing in such a way and, in relation to the outer housing, a preferably radial ignition transfer opening is provided in the outer housing so that ignition gas generated in the igniter unit flows into the interior of the outer housing via the ignition transfer openings. In the gas generator proposed, the igniter unit thus does not project axially into the combustion chamber, but rather the igniter unit is arranged outside the outer housing, so that the so-called ignition gas can emerge from the igniter unit via the radial ignition transfer opening into the interior of the outer housing and, hence, into the combustion chamber. Through this so-called lateral ignition, on the one hand a greater ignition surface can be made available, and on the other hand the igniter unit no longer projects deep into the combustion chamber, which facilitates the filling process of the combustion chamber with solid propellant and leads to a better fixing in position with the use of propellant tablets. In addition, radial outflow openings are provided in the outer housing, so that the propellant bed comprised of solid propellant is not flowed through in axial direction, as in the prior art, and hence in its greatest extent, but rather is flowed through radially on a shorter path, which reduces the erosion of the propellant.

The igniter unit, in accordance with an embodiment, does not project into the r combustion chamber, so that the igniter unit in no way impedes the filling of the combustion chamber. The preferably cylindrical combustion chamber has an axially arranged filling opening.

The combustion chamber is to be constructed as far as possible without undercut, as already mentioned, e.g. is to be cylindrical, in order to make possible a complete and simple filling. With a cylindrical construction of the combustion, chamber, the longitudinal axis of the combustion chamber is to run parallel to the central axis of the outer housing, in order to achieve a compact construction.

The so-called ignition gases, i.e. the mixture of particles and gas which is produced by the igniter unit, can arrive into the combustion chamber even better distributed when a distribution space for the produced ignition gas is provided between the inner face of the outer housing and the combustion chamber wall. The ignition transfer opening also opens out into the distribution space. The distribution space preferably extends across the entire axial length of the combustion chamber, so that the gas spreads out from the igniter unit along the preferably elongated distribution space on the entire axial length and from there arrives across a very large area into the combustion chamber, which leads to a so called "gentle" ignition of the solid propellant.

According to the preferred embodiment, an expansion space for gas is arranged between the combustion chamber and outflow openings on the outer housing, which can likewise extend across the entire axial length of the combustion chamber.

The distribution or expansion spaces can be formed in that the combustion chamber wall, constructed as an insert, has at least one radially inwardly directed indentation, which as stated preferably runs across the entire length of the combustion chamber.

Except for the distribution and expansion spaces, the insert can lie with its entire surface against the inner face of the outer housing and can therefore be positioned so as to be securely in place.

The insert can be constructed as a single-layered filter or as a perforated sheet, which makes it possible to dispense with a thick filter insert in the entire gas generator.

A preferred embodiment makes provision that the outflow openings are arranged in a region lying diametrically opposite the ignition transfer opening, i.e. on one side there takes place the introduction of the ignition gases, which are firstly distributed axially, in order to then penetrate the propellant bed, and it is only on the opposite side that the generated gas can flow out from the gas generator.

BRIEF DESCRIPTION OF THE DRAWINGS

FIG. 5 shows a longitudinal sectional view through the gas generator of the 10 invention in accordance with a third embodiment, FIG. 6 shows a cross-sectional view through the gas generator along line VI—VI in FIG. 5 and FIG. 7 shows a cross-sectional view through the gas generator of the t. invention in accordance with a further embodiment.

DETAILED DESCRIPTION OF THE PREFERRED EMBODIMENTS

Figure 1:
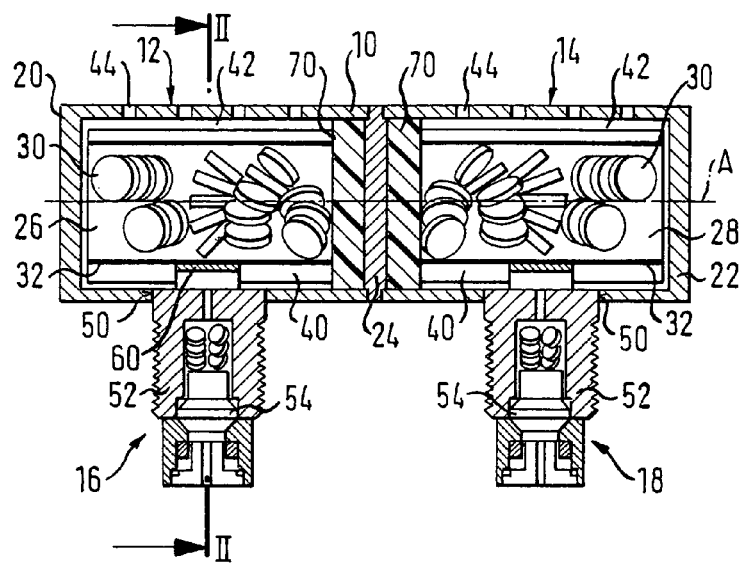
FIG. 1 shows a longitudinal sectional view through a first embodiment of the gas generator according to the invention.

In FIG. 1 an elongated tubular gas generator is illustrated, which has a cylindrical outer housing 10. The tubular gas generator consists of two stages 12, 14, which can be activated independently of each other and have associated igniter units 16, 18. The outer housing 10 of the gas generator is composed of two cylindrical tubes 20, 22 closed on one side, which are connected with each other by an intermediate wall 24. Inside the outer housing 10, each stage is provided with its own cylindrical and elongated combustion chamber 26, 28, which is filled with solid propellant 30 in tablet form to form a propellant bed. The combustion chambers 26, 28 are formed by a combustion chamber wall 32 in the form of a cylindrical filter body insert, open on both sides and closed peripherally. This filter body lies on the inner face of the outer housing 12 across its entire surface, but has two radially inwardly directed indentations extending across its entire axial length, which lie in regions diametrically opposite the central axis A of the outer housing 10. These indentations, together with the inner face of the outer housing 10, delimit spaces extending across the entire axial length of each combustion chamber 26, 28, namely a distribution space 40 and an expansion space 42 which is arranged in the region of outflow openings 44 in the outer housing 10. Diametrically opposite the outflow opening 44, there is provided for each igniter unit 16, 18 in the outer housing 10 an ignition transfer opening 50. This is aligned radially to the central axis A.

Each igniter unit 16, 18 consists of a cup-shaped housing 52, which is placed laterally from the exterior onto the outer housing 10. In the housing 52, an igniter 54 and a booster charge 56 are arranged. An ignition transfer opening 58 on the end face, running radially to the central axis A, allows the outflow of so-called ignition gases, i.e. the combustion products (gas and particles) on activation of the igniter 54 and combustion of the amplifier charge 56.

In the region of the ignition transfer opening 58, adjacent to the combustion chamber wall 32, an axially short, curved baffle plate 60 is arranged, which does not have any openings.

With regard to the igniter units 16, 18, it is to be emphasized that these can only lie against the outer face of the outer housing 10 or, as illustrated in FIG. 1, also partially project into the ignition transfer opening 50.

In each case, however, the igniter units 16, 18 do not project into the combustion chambers 26, 28.

For filling the combustion chamber, the two tubes 20, 22 are not yet connected with each other, so that they have one axial filling opening (open end) each. As the combustion chambers 26, 28 are constructed without undercuts, they can be filled completely and very simply axially with solid propellant 30. Then in each case an elastic filling disc 70 is introduced, before both tubes 20, 22 are fastened to the intermediate wall 24.

The mode of operation of the illustrated gas generator is explained below. When one of the igniters 54 is activated, a combustion of the booster charge 56 is brought about, and via the ignition transfer opening 58 hot ignition gas escapes from the housing 52 and flows radially out into the outer housing 10. The ignition transfer opening 50 permits the inlet of the outflow gases into the interior of the outer housing 10. The gas strikes directly onto the baffle plate 60 and is deflected axially through 90°, therefore is distributed on the entire length in the distribution space 40 and finally arrives into the corresponding combustion chamber 26, 28.

The solid propellant 30 is ignited across a large area and the resulting gases can leave the combustion chamber across a large area in the direction of the expansion space 42 and finally leave the outer housing 10 via the outflow openings 44.

High peak pressures in the combustion chambers 26, 28 are avoided; a gentle ignition of the propellant takes place, the necessary minimum pressure being able to be kept at a certain level over the entire duration of combustion.

Figure 2:
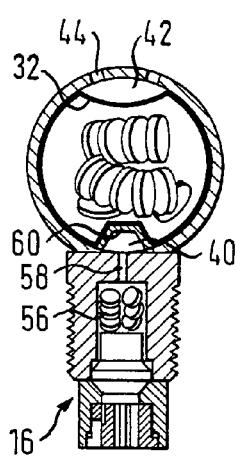
FIG. 2 shows a cross-sectional view along the line II—II in FIG. 1.
Figure 4:
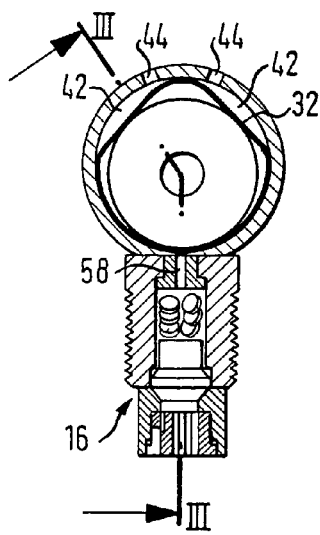
FIG. 4 shows a cross-sectional view through the gas generator along line IV—IV in FIG. 3.
Figure 3:
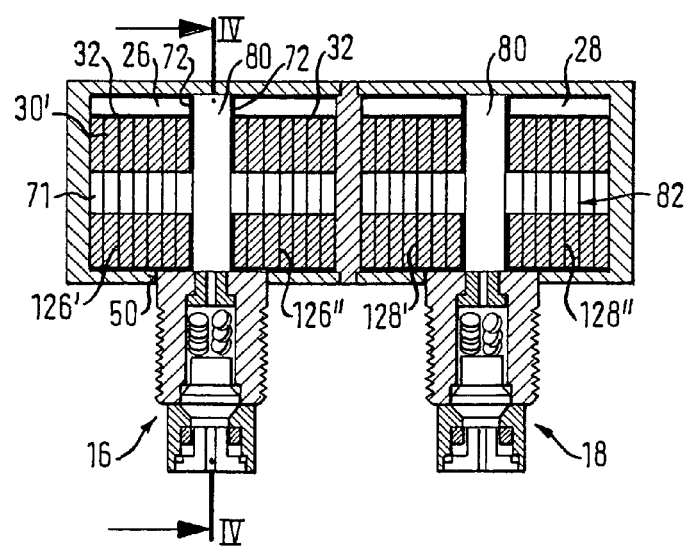
FIG. 3 shows a longitudinal sectional view through a gas generator of the invention in accordance with a second embodiment along line III—III in FIG. 4.

The embodiment according to FIGS. 3 and 4 corresponds in part to that according to FIGS. 1 and 2, so that the reference numbers already introduced are used for parts having identical function and only the differences which exist need to be described in detail.

The solid propellant 30' is constructed in disc form with a central opening. The discs, which are asymmetrical to the central axis, are stacked one on another and may have small extensions or protuberances on the end face for mutual spacing. Each combustion chamber 26, 28 has two stacks of solid propellant discs 30', which in the region of the opening 58 for the central entry of gas are spaced apart from each other, for example by means of two sheet metal discs 72. The sheet metal discs 72 have openings in the region of the holes 71. It could therefore be stated that in the embodiment according to FIG. 3, each combustion chamber 26, 28 is divided into two smaller combustion chambers 126', 126" and 128' and 128".

For each stack of solid propellant discs 30', in addition its own cylindrical filter body is provided, which forms the combustion chamber wall 32.

As can be seen from FIG. 4, there are two peripherally spaced rows of outflow openings 44 in the outer housing 10. The combustion chamber wall 32 has two indentations which each are associated with a row of outflow openings 44, so that two expansion spaces 42, seen in cross-section, are produced. The expansion spaces 42 extend across the entire length of each pack of solid propellant tablets 30' and therefore across an associated, divided, separate combustion chamber 126', 126", 128', 128".

In this embodiment, the gas generated in the igniter unit 16, 18 flows via the ignition transfer opening 58 out from the corresponding igniter unit 16, 18 and radially into the outer housing 10. The ignition transfer opening 50 permits the entry of the ignition gas into the interior of the outer housing 10. The gas arrives into an intermediate space 80 and into a central channel 82 which is formed by the holes 71 into the solid propellant discs 30', so that the solid propellant 30' is ignited radially from the inside. The generated hot gas arrives into the expansion chambers 42, from where it leaves the outer housing 10 via the outflow openings 44.

The embodiment according to FIGS. 5 and 6 corresponds substantially to that shown in FIGS. 1 and 2. Here, however, the baffle plate 60 is omitted. Instead of this, a nozzle-shaped extension 90 additionally projects out from the housing 52 into the distribution space 40. The nozzle-shaped extension 90 has a radial ignition transfer opening 58, which is constructed as a blind bore. This blind bore meets a through-bore 92 running perpendicularly hereto, which is aligned parallel 25 to the axis A.

The gas generated in the ignition unit 16, 18 is deflected through 90° in the nozzle-shaped extension 90 and leaves the latter in two streams which run parallel to the axis A in the direction of the distribution space 40, from where it ignites the solid propellant 30 across a large area. The generated gas finally arrives into the expansion space and leaves the outer housing 10 via the outflow openings 44.

In the embodiments shown, the ignition transfer openings 58 in the housing 52 direct the ignition gas into the outer housing 10. If, however, the housing 52 does not partially project through the ignition transfer opening 50, the ignition transfer opening 50 also directs ignition gas into the interior of the outer housing 10.

The embodiment according to FIG. 7 corresponds substantially to that shown in FIG. 4, the filter defining the combustion chamber wall 32 being omitted. To provide a distribution space 40 and an expansion space 42, the solid propellant discs 30″ have flattened areas or indentations 100.

What is claimed is:

1. A gas generator comprising an elongated, tubular outer housing (10),
   at least one combustion chamber (26, 28) provided therein and filled with a solid propellant (30; 30′),
   and at least one igniter unit (16, 18) generating ignition gas for igniting said solid propellant (30; 30′) and having an igniter (54) integrated within said igniter unit (16, 18),
   said igniter unit (16, 18) being arranged radially and externally on said outer housing (10) and said igniter (54) being positioned completely outside of said outer housing (10) and a, with respect to said outer housing (10), first radial ignition transfer opening (50) being provided in said outer housing (10), said ignition gas generated in said igniter unit (16, 18), before reaching said solid propellant (30; 30′), flowing via said first ignition transfer opening (50) into one of a distribution space (40) and an intermediate space (80) arranged outside of said igniter unit (16, 18) and into an interior of said outer housing (10), said one of a distribution space (40) and an intermediate space (80) being free of propellant and defined by an inner face of said outer housing (10) and a wall (32, 72).

2. The gas generator according to claim 1, wherein a second ignition transfer opening (58) is provided in said igniter unit (16) in a region of the fastening of said igniter unit (16) to said outer housing.

3. The gas generator according to claim 1, wherein said igniter unit (16, 18) does not project into said combustion chamber (26, 28).

4. The gas generator according to claim 1, wherein said combustion chamber (26, 28) has an axially arranged filling opening.

5. The gas generator according to claim 1, wherein said combustion chamber (26, 28) is constructed without an undercut.

6. The gas generator according to claim 1, wherein said combustion chamber (26, 28) is cylindrical and has a longitudinal direction running parallel to a central axis (A) of said outer housing (10).

7. The gas generator according to claim 1, wherein said distribution space (40) extends across an entire axial length of said combustion chamber (26).

8. The gas generator according to claim 7, wherein said outer housing (10) has outflow openings (44) and an expansion space (42) for gas is provided between said combustion chamber (26, 28) and said outflow openings (44).

9. The gas generator according to claim 8, wherein said expansion space (42) extends across said entire axial length of said combustion chamber (26, 28).

10. The gas generator according to claim 8, wherein said combustion chamber wall (32) is formed by an insert which has a radially inwardly directed indentation to produce said expansion space (42).

11. The gas generator according to claim 10, wherein except for said distribution space (40) and said expansion space (42), said insert lies with an entire surface against said inner face of said outer housing (10).

12. The gas generator according to claim 1, wherein said combustion chamber wall (32) is formed by an insert which has a radially inwardly directed indentation to produce said distribution space (40).

13. A gas generator comprising an elongated, tubular outer housing (10),
   at least one combustion chamber (26, 28) provided therein and filled with a solid propellant (30; 30′),
   and at least one igniter unit (16, 18) generating ignition gas for igniting said solid propellant (30; 30′) and having an igniter (54) integrated within said igniter unit (16, 18),
   said igniter unit (16, 18) being arranged radially and externally on said outer housing (10) and said igniter (54) being positioned completely outside of said outer housing (10) and a, with respect to said outer housing (10), first radial ignition transfer opening (50) being provided in said outer housing (10), said ignition gas generated in said igniter unit (16, 18), before reaching said solid propellant (30; 30′), flowing via said first ignition transfer opening (50) into one of a distribution space (40) and an intermediate space (80) arranged outside of said igniter unit (16, 18) and into an interior of said outer housing (10), said one of a distribution space (40) and an intermediate space (80) being defined by an inner face of said outer housing (10) and a wall (32, 72), wherein said outer housing has outflow openings (44) which are arranged in a region lying diametrically opposite said first ignition transfer opening (50) as seen relative to a central axis (A) of said outer housing (10).

14. The gas generator according to claim 13, wherein said distribution space (40) extends across an entire axial length of said combustion chamber (26).

15. The gas generator according to claim 14, wherein said outer housing (10) has outflow openings (44) and an expansion space (42) for gas is provided between said combustion chamber (26, 28) and said outflow openings (44).

16. The gas generator according to claim 15, wherein said expansion space (42) extends across said entire axial length of said combustion chamber (26, 28).

17. The gas generator according to claim 15, wherein said combustion chamber wall (32) is formed by an insert which has a radially inwardly directed indentation to produce said expansion space (42).

18. The gas generator according to claim 17, wherein except for said distribution space (40) and said expansion space (42), said insert lies with an entire surface against said inner face of said outer housing (10).

19. The gas generator according to claim 13, wherein said combustion chamber wall (32) is formed by an insert which has a radially inwardly directed indentation to produce said distribution space (40).

20. A gas generator comprising an elongated, tubular outer housing (10),
   at least one combustion chamber (26, 28) provided therein and filled with a solid propellant (30; 30′), and
   at least one igniter unit (16, 18) generating ignition gas for igniting said solid propellant (30; 30′),
   said igniter unit (16, 18) being arranged laterally and externally on said outer housing (10) and, in relation to said outer housing (10), a radial ignition transfer opening (50, 58) being provided in said outer housing so that said ignition gas generated in said igniter unit (16, 18) flows into an interior of said outer housing (10) via said ignition transfer opening (50, 58), wherein said combustion chamber is defined by a combustion chamber wall (32) and wherein between an inner face of said outer housing (10) and said combustion chamber wall (32) a distribution space (40) is provided for ignition gas produced by said igniter unit (16,18), said ignition transfer opening (50,58) opening into said space (40), wherein said distribution space (40) extends across an entire axial length of said combustion chamber (26), wherein said outer housing (10) has outflow openings (44) and an expansion space (42) for gas is provided between said combustion chamber (26,28) and said outflow openings (44), wherein said combustion chamber wall (32) is formed by an insert which has a radially inwardly directed indentation to produce said expansion space (42).

21. A gas generator comprising an elongated, tubular outer housing (10),
at least one combustion chamber (26, 28) provided therein and filled with a solid propellant (30; 30'), and
at least one igniter unit (16, 18) generating ignition gas for igniting said solid propellant (30; 30'),
said igniter unit (16, 18) being arranged laterally and externally on said outer housing (10) and, in relation to said outer housing (10), a radial ignition transfer opening (50, 58) being provided in said outer housing so that said ignition gas generated in said igniter unit (16, 18) flows into an interior of said outer housing (10) via said ignition transfer openings (50, 58), wherein said combustion chamber is defined by a combustion chamber wall (32) and wherein between an inner face of said outer housing (10) and said combustion chamber wall (32) a distribution space (40) is provided for ignition gas produced by said igniter unit (16,18), said ignition transfer opening (50,58) opening into said distribution space (40), wherein said distribution space (40) extends across an entire axial length of said combustion chamber (26), wherein said outer housing (10) has outflow openings (44) and an expansion space (42) for gas is provided between said combustion chamber (26,28) and said outflow openings (44), wherein said combustion chamber wall (32) is formed by an insert which has a radially inwardly directed indentation to produce said expansion space (42), wherein except for said distribution space (40) and said expansion space (42), said insert lies with an entire surface against an inner face of said outer housing (10).

22. A gas generator comprising an elongated, tubular outer housing (10) centered on a first axis A,
at least one combustion chamber provided in said housing having a charge of solid propellant in the combustion chamber, and
at least one igniter unit generating ignition gas for igniting said solid propellant and having an igniter (54) integrated within said igniter unit (16,18),
said igniter unit being arranged on said outer housing (10) between opposite ends of said outer housing (10) and said igniter (54) being positioned completely outside of said outer housing (10), said igniter unit being centered on a second axis which extends radially relative to the first axis, and a first radial ignition transfer opening being provided in said outer housing, said first radial igniter transfer opening directing gas flow radially, said ignition gas generated in said igniter unit (16, 18), before reaching said solid propellant, flowing via said first ignition transfer opening into one of a distribution space (40) or an intermediate space (80) arranged outside of said igniter unit (16, 18) and in an interior of said outer housing (10), said one of a distribution space (40) and an intermediate space (80) being free of propellant and defined by an inner face of said outer housing (10) and a wall (32, 72).

23. The gas generator according to claim 22, wherein a second ignition transfer opening (58) is provided in said igniter unit (16) in a region of the fastening of said igniter unit (16) to said outer housing.

24. The gas generator according to claim 22, wherein said igniter unit (16, 18) does not project into said combustion chamber (26, 28).

25. The gas generator according to claim 22, wherein said combustion chamber (26, 28) has an axially arranged filling opening.

26. The gas generator according to claim 22, wherein said combustion chamber (26, 28) is constructed without an undercut.

27. The gas generator according to claim 22, wherein said combustion chamber (26, 28) is cylindrical and has a longitudinal direction running parallel to a central axis (A) of said outer housing (10).

28. The gas generator according to claim 22, wherein said outer housing has outflow openings (44) which are arranged in a region lying diametrically opposite said first ignition transfer opening (50), as seen relative to said first axis A of said outer housing (10).

* * * * *